United States Patent [19]

Blackman

[11] Patent Number: 5,713,655

[45] Date of Patent: Feb. 3, 1998

[54] EMERGENCY SAFETY LIGHT

[76] Inventor: Stephen E. Blackman, 248 Columbia Turnpike, Florham Park, N.J. 07932

[21] Appl. No.: 566,677

[22] Filed: Dec. 4, 1995

Related U.S. Application Data

[63] Continuation-in-part of Ser. No. 377,046, Jan. 23, 1995, Pat. No. 5,473,517.

[51] Int. Cl.⁶ .................................................. F21Y 33/00
[52] U.S. Cl. ............................... 362/95; 362/20; 362/85; 362/86; 362/276; 362/802; 200/312; 200/317
[58] Field of Search ............................ 362/20, 85, 86, 362/95, 183, 276, 802; 200/310, 312, 317

[56] References Cited

U.S. PATENT DOCUMENTS

| | | | |
|---|---|---|---|
| 4,001,803 | 1/1977 | Lombardo | 340/656 |
| 4,611,264 | 9/1986 | Bradley | 362/95 |
| 4,631,649 | 12/1986 | McCue et al. | 362/183 |
| 5,473,517 | 12/1995 | Blackman | 362/95 |

*Primary Examiner*—Stephen F. Husar
*Attorney, Agent, or Firm*—Ezra Sutton, Esq.

[57] ABSTRACT

The present invention provides a housing for an emergency light source which is electrically connectable to a conventional light switch. The housing replaces a conventional switch plate and has at least one opening for receiving the switch actuator of the light switch. The replacement housing includes wires for electrical connection to the light switch and is divided into upper and lower housing sections, wherein the upper section includes a battery compartment, a printed circuit board compartment, and an opening to receive the switch actuator. The lower housing section includes a compartment for receiving a compact fluorescent lamp, reflectors, and a diffuser cover. The printed circuit board includes a recharger for the batteries; a power-sensing device for sensing power interruption; an ON/OFF relay switch which is turned on in response to a power failure and actuates the emergency light source; a LED charging indicator light to show that the batteries are charging; a manual test switch; and a transformer, a fluorescent ballast, and starter components for the fluorescent lamp.

27 Claims, 8 Drawing Sheets

EMERGENCY SAFETY LIGHT

FIELD OF THE INVENTION

The invention relates to a housing for an emergency light source and, more particularly, an emergency light source for automatically illuminating an area in response to a power failure.

RELATED APPLICATION

This application is a continuation-in-part of application Ser. No. 08/377,046, filed on Jan. 23, 1995, now U.S. Pat. No. 5,473,517.

BACKGROUND OF THE INVENTION

Frequently, homes, offices, and industrial plant facilities experience many types of emergency situations involving power failures where an interior or exterior area has no light. The power failures may be caused by electrical short circuits, brown-outs, fire, accidents, natural disasters (i.e., floods, hurricanes, tornadoes, etc.), or a planned shutoff of electricity to a facility or dwelling. As a result of these emergencies, most facilities, and especially residential homes, do not have emergency generators to provide lighting, or they only have emergency lighting in the form of portable light sources, such as flashlights.

A need exists for a simple and easily installable emergency light source which includes a fixedly-attached housing for replacement of standard switch plates and which activates itself in response to a power failure of any kind.

DESCRIPTION OF THE PRIOR ART

Switch plate devices having an illumination source and/or having a rechargeable flashlight contained thereon are commercially available and have been disclosed in the prior art. For example, U.S. Pat. No. 4,514,789 discloses a housing on a switch plate having an LED to locate a light switch in the dark. U.S. Pat. No. 4,611,264 discloses a housing adhesively attached to a switch plate having a light to locate the light switch in the dark. The housing can be removed and used as a flashlight.

The prior art devices do not disclose a housing which is easily installable and connectable to a conventional light switch to provide automatic illumination to an area when a power failure occurs.

Accordingly, it is a primary object of the present invention to provide a simple and easily installable emergency light source which includes a housing for the replacement of standard switch plates and which activates itself in response to a power failure of any kind.

Another object of the present invention is to provide a housing for an emergency light source which is electrically connectable to a conventional light switch.

Another object of the present invention is to provide an emergency light source which is battery operated and can operate with different types of light sources, such as a fluorescent lamp or an incandescent lamp.

A further object of the present invention is to provide an emergency light source which has a sensing device for sensing a power failure and automatically actuating the emergency light source.

A further object of the present invention is to provide a multi-position switch for controlling a light source by selecting a motion sensor, a timer, or a switch.

A still further object of the present invention is to provide a housing for an emergency light source which can be mass produced in an automated and economical manner and is relatively inexpensive.

SUMMARY OF THE INVENTION

The present invention provides a housing for an emergency light source which is electrically connectable to a conventional light switch. The housing replaces a conventional switch plate and has at least one opening for receiving the switch actuator of the light switch. The housing may have several switch openings for a plurality of switch actuators. The housing includes wires for electrical connection to the light switch.

The housing is divided into upper and lower sections, wherein the upper section includes a battery compartment, a printed circuit board compartment, and an opening to receive the switch actuator. The lower housing section includes a compact fluorescent lamp having reflectors and a diffuser cover.

The fluorescent lamp is connected to the batteries via the printed circuit board. The printed circuit board includes a recharger for the batteries; a power-sensing device for sensing power interruption; an ON/OFF relay switch which is turned on in response to a power failure; a LED charging indicator light to show that the batteries are charging; a manual test switch; and a transformer, fluorescent ballast, and starter components for the fluorescent lamp. The printed circuit board is electrically connected to the light switch.

Alternatively, the power source may be located outside of the housing at a remote location, and the light source may be one or more incandescent lamps.

BRIEF DESCRIPTION OF THE DRAWINGS

Further objects, features, and advantages of the present invention will become apparent upon consideration of the detailed description of the presently-preferred embodiments, when taken in conjunction with the accompanying drawings, wherein.

DETAILED DESCRIPTION OF THE FIRST EMBODIMENT

Figure 1:
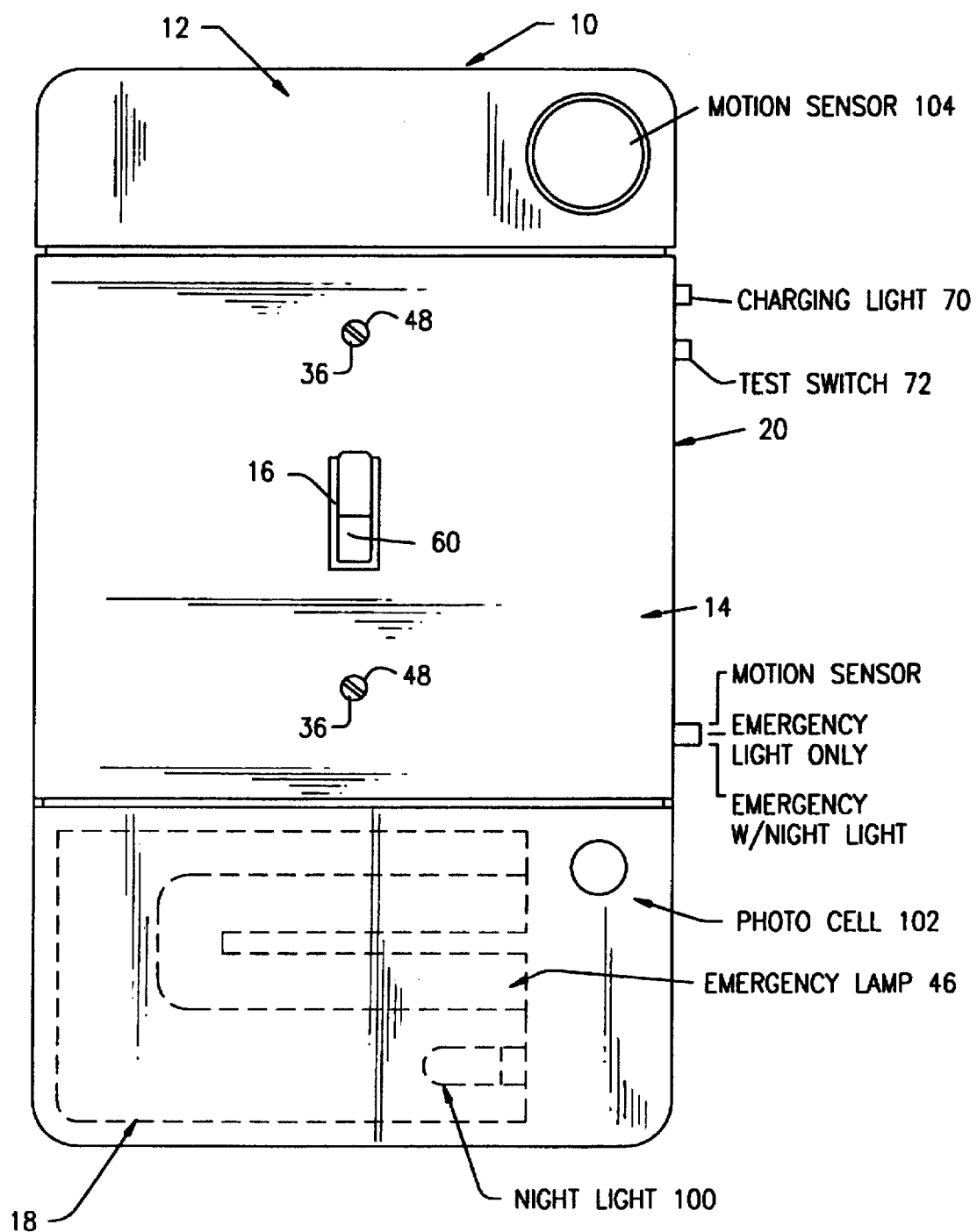
FIG. 1 is a perspective view of the present invention showing the emergency safety light having one switch actuator, a switch cover, and a light diffuser cover.

The first embodiment of the present invention provides for an emergency safety light housing 10 having front and rear housing sections 12 and 20, as shown in FIG. 1 of the drawings. The front housing section 12 comprises an upper plastic switch plate cover 14 having at least one light switch opening 16 and a lower clear acrylic diffuser cover 18.

Figure 4:
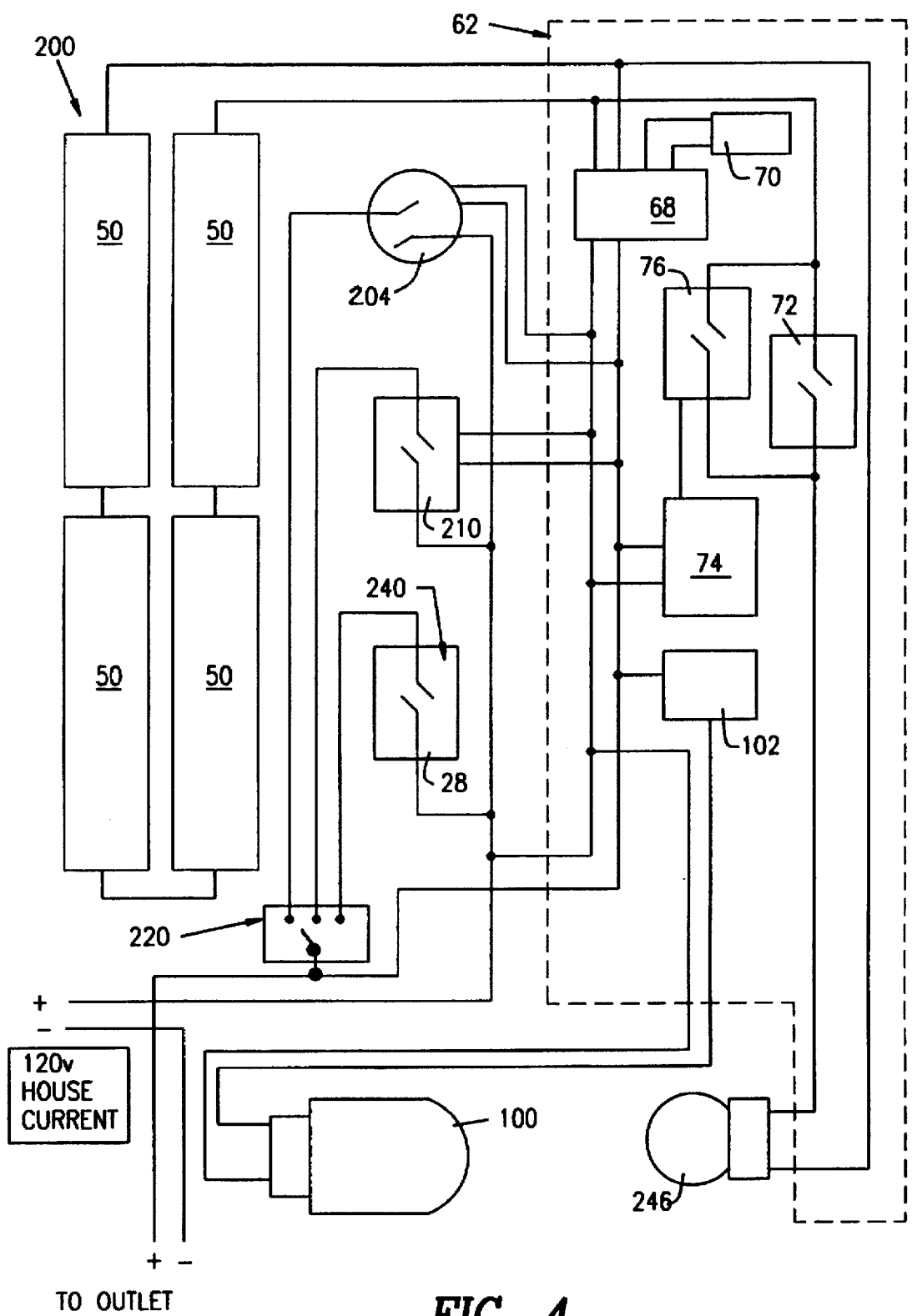
FIG. 4 is a circuit diagram showing a second embodiment of the present invention.

Switch plate cover 14, in other embodiments, may have a plurality of switch openings 16 to accommodate the light switch actuators 60. Switch actuators 60 may be of any type, such as the one shown, or a rocker-arm type. Switch plate cover 14 may also have a plurality of mounting openings 48 for mounting screws 36, as depicted in FIGS. 1 and 4. Switch plate cover 14 may be of plastic, metal, wood, ceramic, or other suitable materials of varying colors and designs. The housing 10, in alternate embodiments, may have shapes that are spherical, oval, cylindrical, or other suitable geometrical designs.

Figure 2:
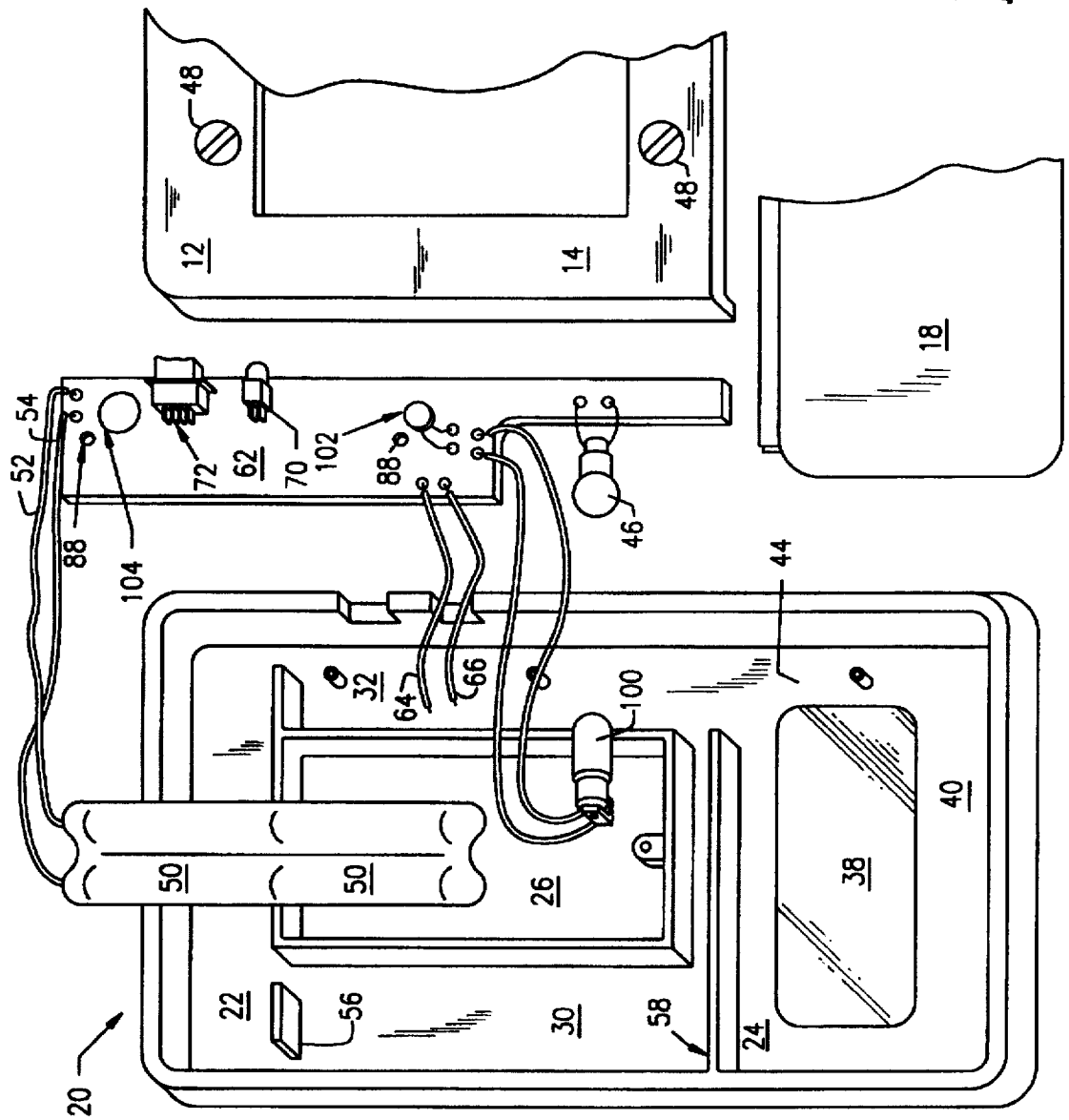
FIG. 2 is a front plan view of the present invention with the cover removed, showing the upper and lower sections of the housing having the batteries, the printed circuit board, and the emergency light source.

The rear housing section 20, as depicted in FIGS. 2 and 4, comprises an upper section 22 and a lower section 24. The upper housing section 22 includes an opening 26 for receiving the light switch assembly 28, a battery compartment 30, a printed circuit board compartment 32, a motion sensor 104, and a plurality of mounting receptacle holders 34 for receiving mounting screws 36 for cover plate 14.

The lower housing section 24 includes a metallized mylar reflective film 38 permanently affixed to the rear wall 40 of housing section 20; a metallized plastic reflector 42 having a concave shape and an opening 43 aligned with reflective film 38; and a compartment 44 for receiving a light source 46, a night light 100, and a photo cell 102. Light source 46 can be a fluorescent lamp fixture of 5, 7, or 9 watts of power, or it can be one or more incandescent lamps having 15 or 25 watts of power. Night light 100 is an incandescent lamp, or a fluorescent lamp, or an electroluminescent film. Of course, other wattages may be used, and other types of light sources may be used, where appropriate. Light source 46 is hard wired at 84 to the circuit board 62.

Figure 3:
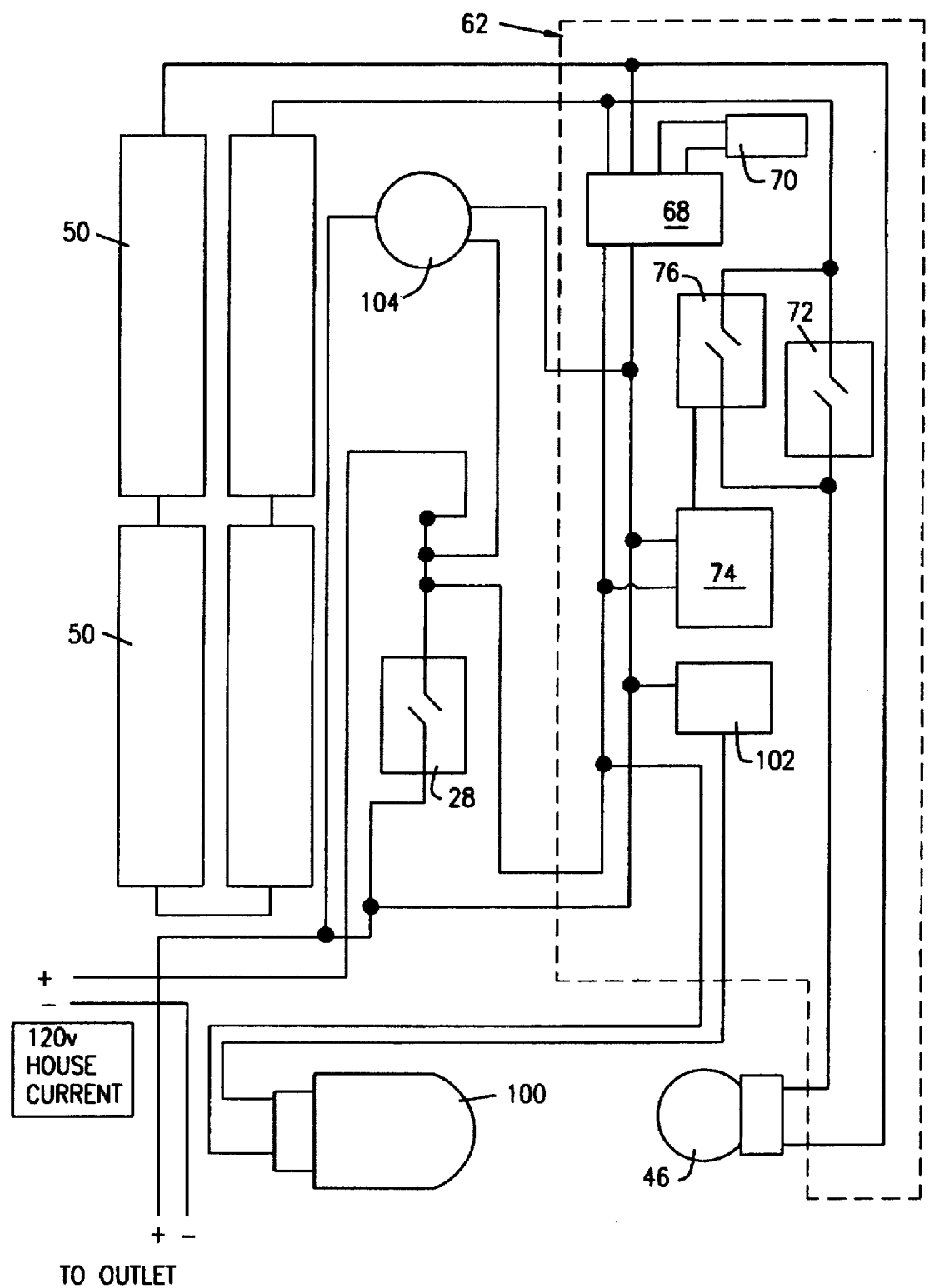
FIG. 3 is a circuit diagram for the emergency light showing the circuit wiring for the batteries, printed circuit board, and the emergency light source.

The electrical arrangement of the present invention, as shown in FIGS. 3 and 4, includes circuit wires 64 and 66 connected to circuit board 62 for connection to light switch assembly 28 after the conventional switch plate has been removed. Circuit board 62 also includes components for a battery recharger 68 for charging batteries 50; a charging indicator light 70, such as an LED, that remains ON to indicate that the batteries are recharging; a manual test switch 72 for testing the functioning of light source 46; a power interruption detector 74 for sensing a power failure; an ON/OFF relay switch 76 which is turned ON in a response to a power failure; a night light 100; a photo cell 102 for turning on and off night light 100; and a motion sensor 104 having a 120 volt switch for turning on a light fixture in the room or other load when a person enters the room and passes the motion sensor 104. The printed circuit board 62 has openings 88 for holding braces 86 located on wall 40, which holds the circuit board 62 firmly in place when emergency light housing 10 is on a wall in a dwelling or other building.

The power source 50 can be a battery or plurality of batteries for energizing the light source 46 when a power failure occurs. In this first embodiment, as shown in FIGS. 1, 2, and 3, the power source 50 is a series of four AA batteries. The batteries 50 are placed in the battery compartment 30 between receptor plates 56, 58 and are electrically connected via circuit wires 52, 54 to the printed circuit board 62. In an alternate embodiment, the power source 46 may be located outside of the housing 10 at a remote location in the form of solar energy cells, a hydrological energy source, 12-volt batteries, or other appropriate power sources, which can energize the light source 46 when a power failure occurs.

OPERATION AND INSTALLATION OF THE FIRST EMBODIMENT

When a power failure occurs, the power interruption detector 74 senses this loss of power and causes the ON/OFF relay switch 76 to move to the ON position. This allows energy to be supplied from the power source 50 to the light source 46, which instantly illuminates the unlighted area. The mylar reflective film 38 and metallized plastic reflector 42 enhance the amount and area of illumination.

Prior to a power failure, operation of the LED charging indicator light 70 shows that the power source of batteries 50 is charging, and a manual test of switch 72 tests the functioning of the light source 46 to see if illumination occurs.

Night light 100 and motion sensor 104 are powered by the 120 volt house current. Night light 100 is controlled by photo cell 102, and motion sensor 104 controls the light fixture in the room or other load when a person enters.

To install the housing 10 of the present invention, it is only necessary to remove the conventional switch plate and then connect switch circuit wires 64 and 66 of the printed circuit board 62 in the upper housing section 22 to the light switch 28. The emergency light source 46 is not energized by this connection until there is a power failure, or until there is a manual testing of test switch 72, which illuminates the light source 46.

SECOND EMBODIMENT

Figure 5:
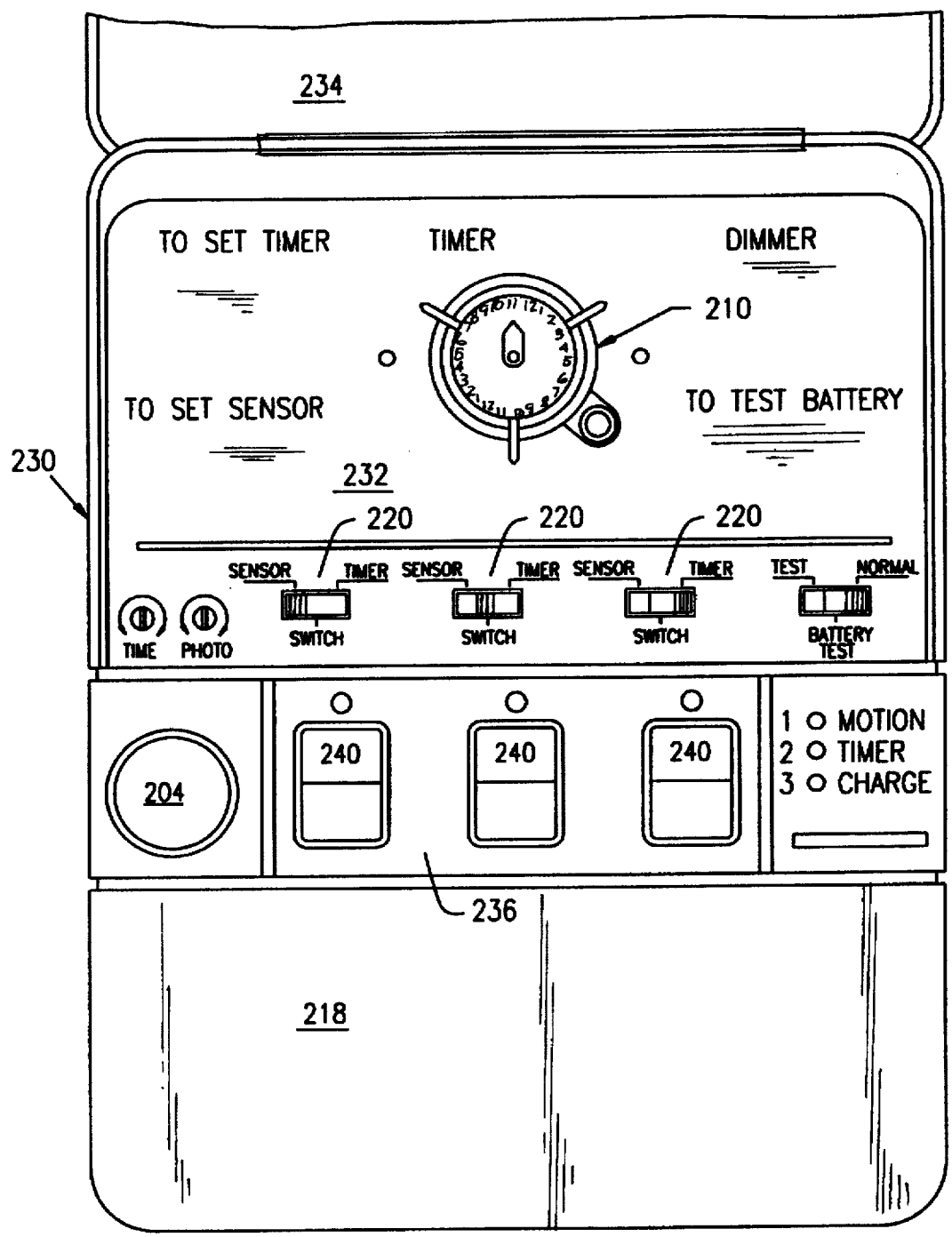
FIG. 5 shows the cover for the second embodiment.
Figure 6:
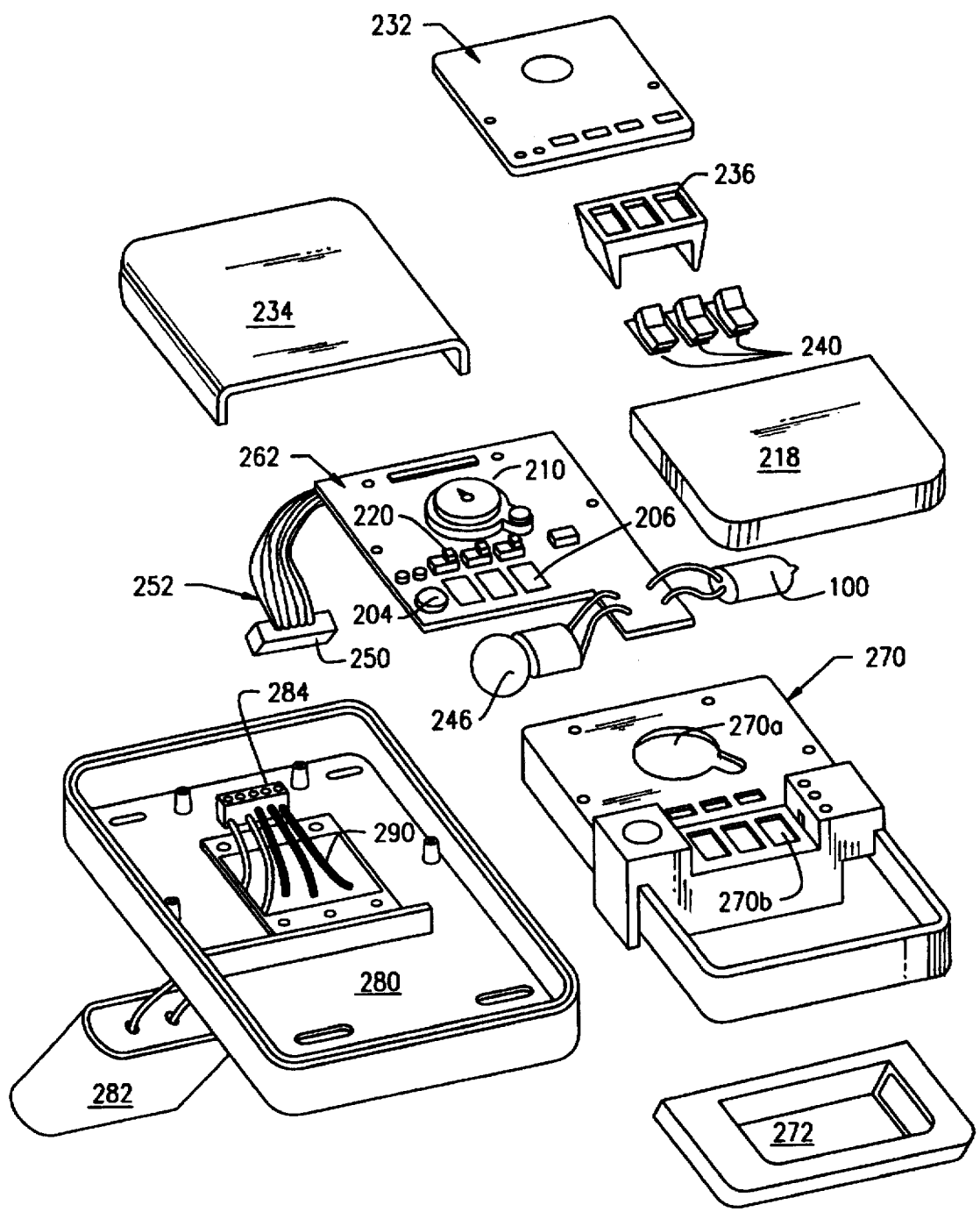
FIG. 6 is an exploded perspective view of the second embodiment.

The second embodiment 200 depicted in FIGS. 4 to 6 is similar to the first embodiment, but also includes a timer 210, a multi-position switch 220, and a replacement switch 240 for replacing conventional switch 28. As shown in FIG. 4, switch 220 has 3 positions and allows the user to select one of the 3 positions to control the light fixture or other loads located in the room. If position A is selected, the motion sensor 204 controls the light fixture; if position B is selected, the timer 210 controls the light fixture; and if position C is selected, the switch 240 controls the light fixture in the room. Alternatively, additional positions may be provided, so that one may select A and C together or B and C together.

FIG. 5 shows the housing 230 for the second embodiment 200. Housing 230 includes a panel 232 for instructions, a hinged cover 234, a switch cover 236, a diffuser cover 218, timer 210, three multi-position switches 220, and three replacement switches 240 for replacing the conventional light switches 28. When installing housing 230, it is necessary to remove conventional switches 28 and connect their wires to replacement switches 240. Since there are 3 replacement switches 240, three different fixtures or zones can be separately controlled by setting the multi-position switch 220 associated with each switch 240. In this manner, each switch 220 can control its associated light fixture or zone by selecting timer 210, motion sensor 204, or switch 240.

FIG. 6 shows the interior of housing 230 including PC board 262 having mounted thereon timer 210, multi-position switches 220, motion sensor 204, openings 206 for switches 240, fluorescent lamp 246, terminal strip 250, and wires 252. Housing 230 also includes a reflector 272, and a chassis 270 having an opening 270a for timer 210, and openings 270b for switches 240.

Housing 230 includes a rear section 280 having a battery 282 connected to it, and a terminal receptor 284 for receiving terminal 250. Terminal receptor 284 includes wires 290 for connection to the wires (not shown) providing the house current, which wires are exposed after conventional switches 28 are removed.

THIRD EMBODIMENT

Figure 7:
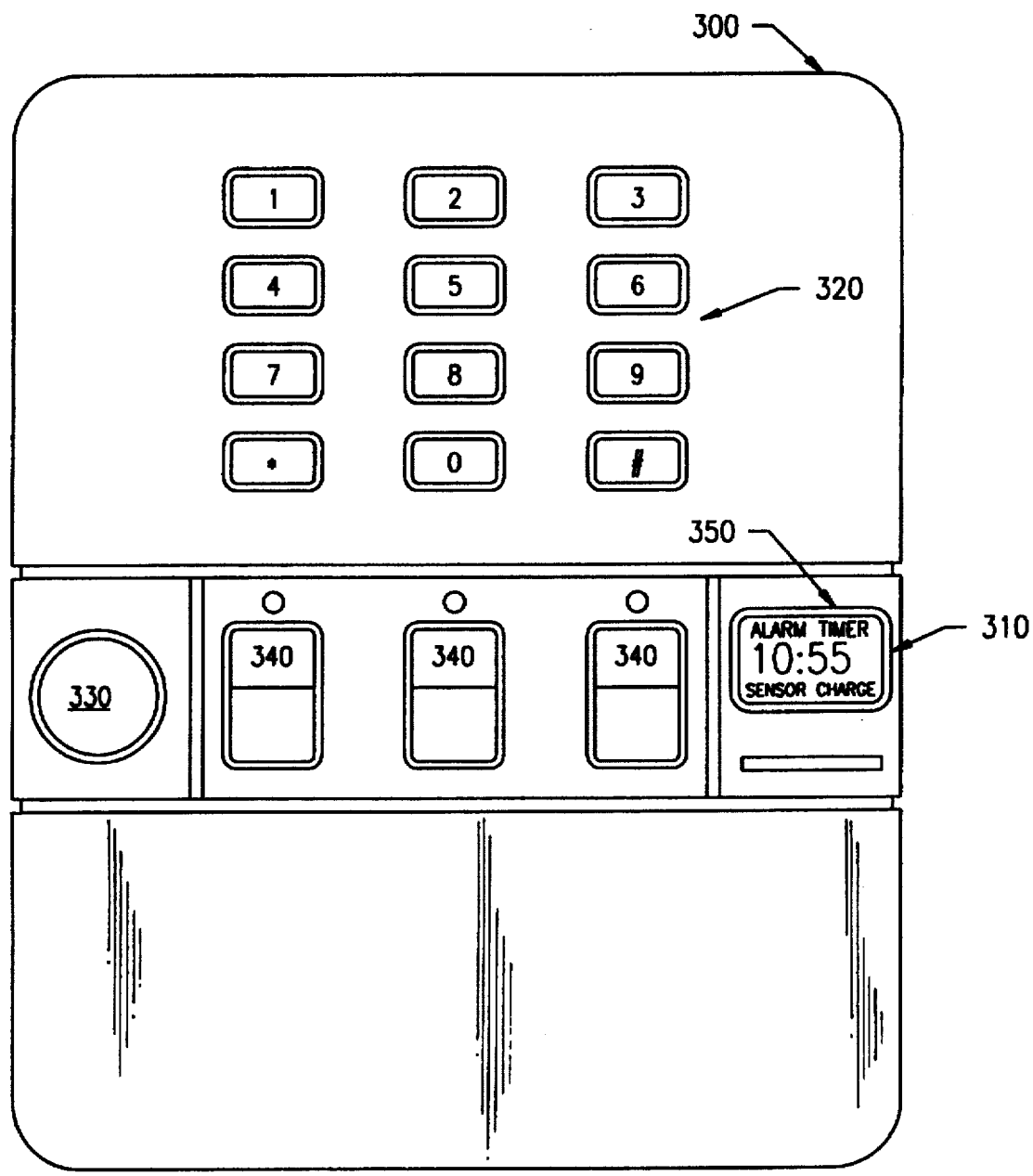
FIG. 7 shows the cover for the third embodiment.
Figure 8:
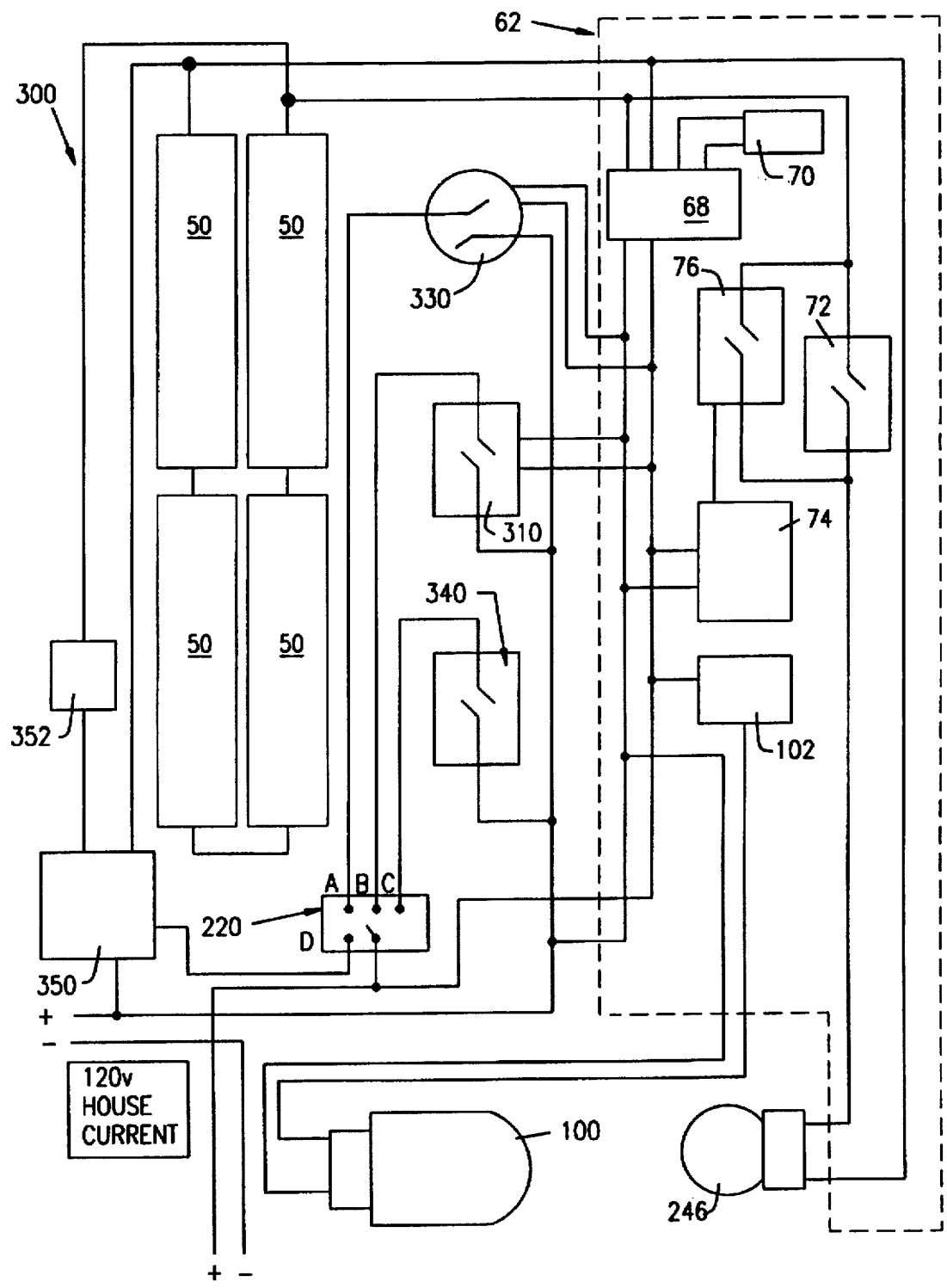
FIG. 8 shows the cover for the circuit diagram for the third embodiment.

The third embodiment 300 depicted in FIGS. 7 and 8 includes a digital timer 310, a keypad 320, a motion sensor 330, replacement switches 340, and an alarm circuit 350 which includes motion sensor 330, and an alarm horn 352. The third embodiment includes all of the features of the second embodiment, but utilizes a digital timer 310 instead of mechanical timer 210 to perform the same functions. Keypad 320 is employed to control the alarm circuit and activate the digital timer 310. A code is entered into the keypad 320 and this activates and de-activates the alarm circuit 350. When a person passes the motion sensor 330, the alarm horn 352 and/or lights are activated, as is known in the art.

This embodiment also includes a multi-position switch like that of switch 220 to select the digital timer 310, the motion sensor 330, or switch 340 to control the light fixture or load.

ADVANTAGES OF THE PRESENT INVENTION

Accordingly, a primary advantage of the present invention is that it provides a simple and easily installable emergency light source which includes a fixedly-attached housing for the replacement of standard switch plates and which activates itself in response to a power failure of any kind.

Another advantage of the present invention is that it provides a housing for an emergency light source which is electrically connectable to a conventional light switch.

Another advantage of the present invention is that it provides an emergency light source which is battery operated and can operate with different types of light sources, such as a fluorescent lamp or an incandescent lamp.

A further advantage of the present invention is that it provides an emergency light source which has a sensing device for sensing a power failure and for automatically actuating the emergency light source.

A further advantage of the present invention is that it provides a multi-position switch for controlling a light source by selecting a motion sensor, a timer, or a switch.

A further advantage of the present invention is that it provides a housing with an alarm circuit in combination with the other features.

A still further advantage of the present invention is that it provides a housing for an emergency light source which can be mass produced in an automated and economical manner and is relatively inexpensive.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. A housing for an emergency light source which is electrically and mechanically connectable to a conventional light switch and light fixture, comprising:
    a) a housing for replacement of a conventional switch plate having at least one opening for receiving the switch actuator of said light switch;
    b) a first compartment in said housing for receiving batteries;
    c) a second compartment in said housing for receiving an emergency light source adapted to be connected to said batteries;
    d) means for sensing the loss of electrical power to said light switch and, in response thereto, for actuating said emergency light source;
    e) means for electrically connecting said housing to said light switch;
    f) a night light mounted in said housing; and
    g) a motion sensor mounted in said housing for actuating the light fixture in response to an actuating movement.

2. A housing in accordance with claim 1, wherein said first compartment is adapted to receive four "AA" batteries.

3. A housing in accordance with claim 1, wherein said second compartment is adapted to receive a 5-watt, 7-watt, or 9-watt fluorescent lamp as said emergency light source.

4. A housing in accordance with claim 1, wherein said second compartment is adapted to receive at least one incandescent lamp as said emergency light source.

5. A housing in accordance with claim 1, further including a PC board containing said sensing means.

6. A housing in accordance with claim 1, wherein said means for electrically connecting said housing to said light switch includes a pair of electrical wires.

7. A housing in accordance with claim 1, wherein said sensing means includes power-interruption detector means connected to an on/off relay switch, wherein said power-interruption detector means detects the loss of electrical power to said light switch and operates to turn on said relay switch.

8. A housing in accordance with claim 1, further including a charging means for recharging said batteries and means for turning off said charging means.

9. A housing in accordance with claim 1, further including a charging indicator light for indicating that said batteries are recharging.

10. A housing in accordance with claim 1, further including a manual test switch for testing the functioning of said emergency light source.

11. A housing in accordance with claim 1, wherein said housing includes a switch plate cover having at least one light switch opening.

12. A housing in accordance with claim 1, wherein said housing includes a diffuser cover for diffusing light from said light source.

13. A housing in accordance with claim 1, wherein said housing includes a compartment for receiving a printed circuit board.

14. A housing in accordance with claim 1, wherein said housing further includes at least one reflector for reflecting light from said light source.

15. A housing in accordance with claim 1, further including a photo cell for controlling said night light.

16. A housing for an emergency light source which is electrically and mechanically connectable to a conventional light switch and light fixture, comprising:
    a) a housing for replacement of a conventional switch plate having at least one opening for receiving the switch actuator of said light switch;
    b) means for connecting said housing to a remote power source;
    c) a compartment in said housing for receiving at least one emergency light source adapted to be connected to said power source;
    d) means for sensing the loss of electrical power to said light switch and, in response thereto, for actuating said emergency light source;
    e) means for electrically connecting said housing to said light switch;
    f) a night light mounted in said housing; and
    g) a motion sensor mounted in said housing for actuating the light fixture in response to an actuating movement.

17. A housing for an emergency light source which is electrically and mechanically connectable to a conventional light switch and light fixture or other load, comprising:
   a) a housing for replacement of a conventional switch plate having at least one opening for receiving the switch actuator of said light switch;
   b) means for connecting batteries to said housing;
   c) a compartment in said housing for receiving an emergency light source adapted to be connected to said batteries;
   d) means for sensing the loss of electrical power to said light switch and, in response thereto, for actuating said emergency light source;
   e) means for electrically connecting said housing to said light switch;
   f) a night light mounted in said housing;
   g) a motion sensor mounted in said housing for actuating the light fixture in response to an actuating movement;
   h) a timer mounted in said housing for controlling the light fixture;
   i) a switch mounted in said housing for controlling the light fixture; and
   j) a multi-position switch for selecting said motion sensor, said timer or said switch for controlling the light fixture or other load.

18. A housing in accordance with claim 17, wherein said means for electrically connecting said housing to said light switch includes a pair of electrical wires.

19. A housing in accordance with claim 17, wherein said sensing means includes power-interruption detector means connected to an on/off relay switch, wherein said power-interruption detector means detects the loss of electrical power to said light switch and operates to turn on said relay switch.

20. A housing in accordance with claim 17, further including a manual test switch for testing the functioning of said emergency light source.

21. A housing in accordance with claim 17, further including a photo cell for controlling said night light.

22. A housing for an emergency light source which is electrically and mechanically connectable to a conventional light switch and light fixture or other load, comprising:
   a) a housing for replacement of a conventional switch plate having at least one opening for receiving the switch actuator of said light switch;
   b) means for connecting batteries to said housing;
   c) a compartment in said housing for receiving an emergency light source adapted to be connected to said batteries;
   d) means for sensing the loss of electrical power to said light switch and, in response thereto, for actuating said emergency light source;
   e) means for electrically connecting said housing to said light switch;
   f) a night light mounted in said housing;
   g) a motion sensor mounted in said housing for actuating the light fixture in response to an actuating movement;
   h) a timer mounted in said housing for controlling the light fixture;
   i) a switch mounted in said housing for controlling the light fixture;
   j) a multi-position switch for selecting said motion sensor, said timer or said switch for controlling the light fixture or other load;
   k) an alarm circuit mounted in said housing including said motion sensor; and
   l) a keypad for activating and de-activating said alarm circuit and said timer.

23. A housing in accordance with claim 22, wherein said means for electrically connecting said housing to said light switch includes a pair of electrical wires.

24. A housing in accordance with claim 22, wherein said sensing means includes power-interruption detector means connected to an on/off relay switch, wherein said power-interruption detector means detects the loss of electrical power to said light switch and operates to turn on said relay switch.

25. A housing in accordance with claim 22, further including a manual test switch for testing the functioning of said emergency light source.

26. A housing in accordance with claim 22, further including a photo cell for controlling said night light.

27. A housing in accordance with claim 22, wherein said timer is a digital timer.

* * * * *